United States Patent [19]

Zwirlein

[11] 4,073,664
[45] Feb. 14, 1978

[54] AUTOMATICALLY CONTROLLED CLEANING FLUID CIRCUIT FOR A FOAM GENERATING APPARATUS AND METHOD

[75] Inventor: John F. Zwirlein, New Haven, Conn.

[73] Assignee: Olin Corporation, New Haven, Conn.

[21] Appl. No.: 701,703

[22] Filed: July 1, 1976

Related U.S. Application Data

[63] Continuation-in-part of Ser. No. 656,157, Feb. 9, 1976.

[51] Int. Cl.$^2$ .............................................. B08B 7/04
[52] U.S. Cl. ..................................... 134/18; 239/112; 252/359 E; 134/22 R; 134/34
[58] Field of Search ............ 134/10, 18, 56 R, 157 R, 134/158 R; 137/15, 240; 239/106, 112, 113, 119, 120, 121; 264/39; 252/359 E, 359 R

[56] References Cited

U.S. PATENT DOCUMENTS

| | | | |
|---|---|---|---|
| 3,179,341 | 4/1965 | Plos et al. | 239/112 X |
| 3,382,886 | 5/1968 | Hesselmann | 239/112 X |
| 3,690,556 | 9/1972 | McCain | 239/112 |
| 3,752,398 | 8/1973 | Svensson | 134/18 X |
| 3,764,384 | 10/1973 | Berni | 134/10 |
| 3,790,030 | 2/1974 | Ives | 239/112 X |
| 3,876,114 | 4/1975 | Hecks et al. | 239/112 X |
| 3,940,063 | 2/1976 | Baumgartner et al. | 239/112 X |

*Primary Examiner*—Norman Yudkoff
*Attorney, Agent, or Firm*—Bruce E. Burdick; F. A. Iskander; Thomas P. O'Day

[57] ABSTRACT

An improvement in an on-site foam generating apparatus which includes storage tanks for supplying the foam-forming reactants, a mixing chamber, and means for conveying the reactants through the mixing chamber. The improvement comprises means for automatically cleaning and flushing the mixing chamber. When the foam gun head containing the mixing chamber is at rest and inverted in an opening on the top of a solvent storage tank, solvent is continuously recycled through the mixing chamber. When the foam gun head is removed from the tank, a proximity switch senses the absence of metal and actuates an electrical circuit to operate a solenoid valve to divert the solvent from the mix chamber to a by-pass back to the tank. Additionally, a time delay relay is actuated which operates a solenoid valve for a predetermined period to supply purging gas to and through the mixing chamber upon removal of the foam gun head from the tank.

29 Claims, 5 Drawing Figures

AUTOMATICALLY CONTROLLED CLEANING FLUID CIRCUIT FOR A FOAM GENERATING APPARATUS AND METHOD

RELATED CASE

This application is a continuation-in-part of application Ser. No. 656,157 filed Feb. 9, 1976.

BACKGROUND OF THE INVENTION

This invention relates to an apparatus for the on-site generation of polyurethane foam. More particularly, this invention relates to an apparatus of this type having improved means for automatically cleaning the mixing chamber thereof.

Several portable apparatus have been disclosed in the art for the generation of polyurethane foam. See, for example, U.S. Pat. No. 3,178,157, issued to Cole on Apr. 3, 1965; U.S. Pat. No. 3,541,023, which issued Nov. 17, 1970 to Cole; and U.S. Pat. No. 3,769,232, which issued Oct. 30, 1973, to Houldridge. Apparatus of this type usually includes two storage tanks for supplying two inter-reactive polyurethane-foaming materials, means for imposing a gas pressure in these tanks to expell the reactants therefrom and a mixing chamber having an outlet and two valved inlets for mixing the reactants before they are dispersed as a foaming mixture from the mixing chamber. These prior art apparatus permit dispersing of polyurethane foam on-site for use in an increasing number of applications, such as making molded foam insulation, furniture parts, structural elements, packaging, and so forth.

It has been found desirable to periodically flush the mixing chamber wth a suitable solvent to clean the mixing chamber and remove any material which has accumulated therein. Build-up of material could result in improper mixing, poor flow characteristics, and improper ratio of ingredients, all of which could effect the quality of foam produced.

For the purpose of cleaning the mixing chamber, the apparatus may include a solvent tank which is connected to the mixing chamber to provide a supply of solvent for flushing purposes. Such arrangement is shown, for example, in previously mentioned U.S. Pat. Nos. 3,769,232 and 3,541,023.

During the flushing operation of previously known apparatus, solvent is expelled onto the floor or ground or into a separate container. This results in a waste of solvent and increased expense. In addition, if the solvent is expelled directly onto the floor or ground, it presents an ecological problem as the solvent constitutes a pollutant.

In the above-mentioned copending application Ser. No. 656,157, there is disclosed an improvement in an on-site foam generating apparatus wherein means for recovering the cleaning solvent within the apparatus is provided, with the solvent being recycled through the mixing chamber when an appropriate valve is activated. The present invention is an improvement on the apparatus disclosed in that application and provides an automatic solvent recycling system. In addition, an automatic gas purge system may be provided.

According to the invention, the apparatus is of the type wherein two inter-reactive foam-forming materials are mixed and foam generated. The apparatus includes a foam gun head having a mixing chamber for mixing the materials. Solvent storage means are provided for storing a solvent. The improvement comprises, in general terms, means for supplying solvent from the solvent storage tank to said mixing chamber through an electrically activated solvent valve when said valve is in a first position and for by-passing the mixing chamber and returning the solvent directly to the solvent storage means when the solvent valve is in a second position. Electrical sensing means are provided for sensing the presence of the foam gun head in a first position wherein said foam gun head is in a position to discharge solvent from the mixing chamber into the solvent storage tank. Electrical circuit means is responsive to the electrical sensing means sensing the presence of the foam gun head in the first position to actuate the solvent valve means to move it to its first position and responsive to the removal of said foam gun head from the first position to move said solvent valve to its second position.

In addition, means for supplying purging gas to the mixing chamber may be provided through an electrically actuated purging gas valve which is normally closed. An electrical circuit in response to the electrical sensing means senses the removal of the foam gun head from its first position and causes the opening of the purging gas valve for a predetermined time period to provide a blast of purging gas through the mixing chamber.

DESCRIPTION OF THE DRAWINGS

The present invention may be more readily understood by reference to the following detailed description and to the accompanying drawings, in which.

DETAILED DESCRIPTION

Figure 1:
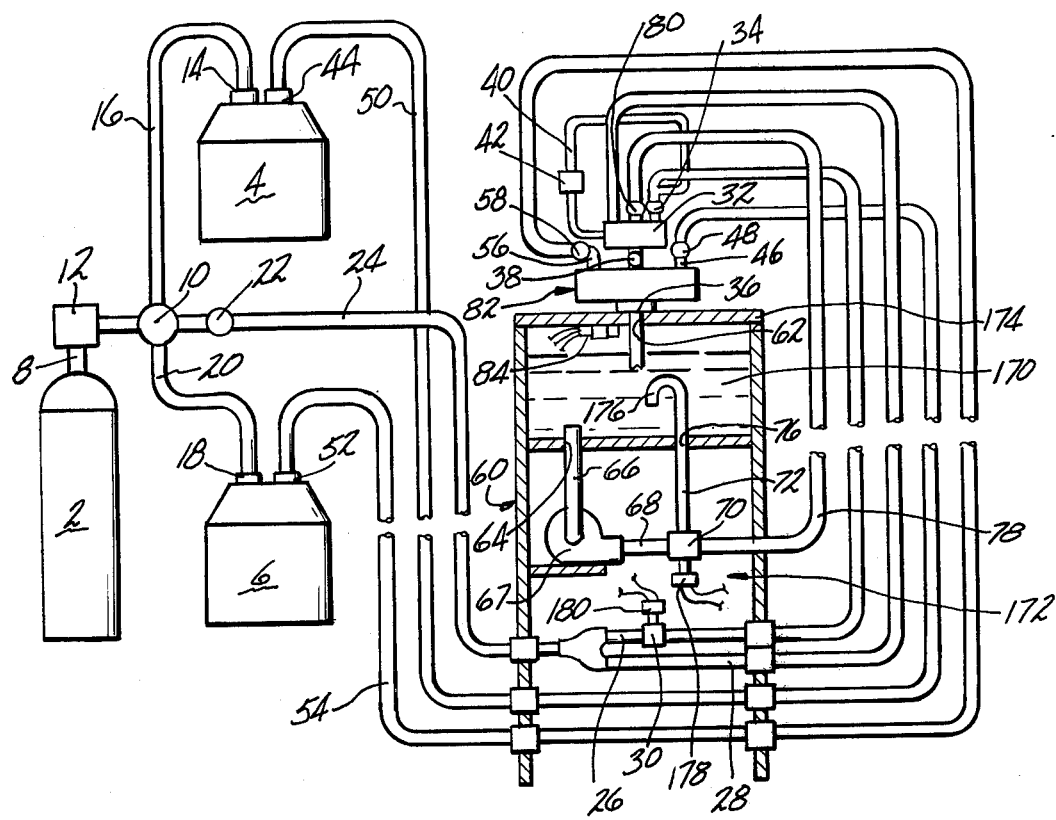
FIG. 1 is a schematic illustration of a preferred apparatus used in practicing the present invention.

The apparatus shown in FIG. 1 generally includes a nitrogen tank 2 which is used to pressurize a first reactant storage tank 4 and a second reactant storage tank 6. The nitrogen tank 2 has an outlet 8 connected to a high pressure regulating valve 10 through a shut-off valve 12. The high pressure regulating valve 10 has three outlets, one of which is connected to the inlet 14 of the first reactant storage tank 4 by suitable connecting line 16. The second outlet is connected to the inlet 18 of the second reactant storage tank 6 by means of a connecting line 20. The third outlet is connected to a low pressure regulator 22, the outlet of which is connected by a suitable connecting line 24 to a Y-connection which splits line 24 into two lines 26 and 28. Line 26 contains an electrically actuated purge gas valve 30, the outlet of which is connected to a distributor block 32 through a check valve 34. Line 28 is connected directly to the distributor block.

The distributor block 32 serves to connect line 26 with a reactant mixing chamber 36 through a check valve 38. The distributor block 32 also serves to connect line 28 with a by-pass line 40 which is connected to line 26 downstream of the check valve 34 through a manually actuated, normally closed valve 42.

The first reactant storage tank 4 has an outlet 44 which is connected to a first inlet 46 of the mixing chamber 36 through an inlet valve 48 by connecting line 50. The second reactant storage tank 6 has an outlet 52, which is connected by means of a connecting line 54 to a second inlet 56 of the mixing chamber 36 through a valve 58.

A solvent storage tank 60 is provided having an inlet 62 and an outlet 64. The outlet is connected by a suitable outlet pipe 66 to a pump 67, which has its outlet 68 connected to a three port, electrically actuated, solvent valve 70. One outlet of the valve 70 is connected to a return pipe 72 which extends into the solvent storage tank 60 through a return inlet 76. The other outlet of the valve 70 is connected by a suitable connecting hose 78 to the distributor block 32 through a check valve 80. The distributor block 32 serves to connect line 78 with the reactant mixing chamber 36 through the check valve 38.

When the foam generating apparatus is at rest, the foam gun head 82, which includes the mixing chamber 36 and valves 38, 48 and 58, is mounted on the tank 60 with its discharge end extending into the interior of the tank 60. An electrical proximity switch 84, which actuates upon the detection of the presence and absence of metal, is mounted on the inside of the tank to sense the presence or absence of the foam gun head 82. The proximity switch is connected to an electrical circuit, shown in detail in FIG. 5 and to be explained more fully below, which causes the actuation of the solvent valve 70 and purging gas valve 30. In general, when the foam gun head is mounted on the tank, solvent valve 70 is positioned to provide communication between outlet 68 and line 78 to permit solvent to flow through the mixing chamber 36. Purging gas valve 30 is normally closed. When the foam gun head 82 is removed from the tank 60, the proximity switch 84 causes the electrical circuit to actuate solvent valve 70 to connect pump outlet 68 with the return line 72 to return the solvent to the tank 60. The proximity switch, upon removal of the foam gun head 82 from the tank 60, causes an electrical circuit to actuate purging gas valve 30 and open the valve 30 for a predetermined time period. After foam has been generated by the actuation of valves 48 and 58, manual switch 42 may be actuated to provide a blast of purging gas through the mixing chamber 36. When the foam gun head 82 is returned to the tank 60, the proximity switch causes the electrical circuit to actuate solvent valve 70 to return it to its normal position wherein it connects outlet 68 with line 78.

More in detail, the nitrogen tank 2 is a conventional nitrogen gas tank used to impose a sealed gas pressure on the interiors of reactant storage tanks 4 and 6. While other means can be used to impose gas pressure on the reactant storage tanks 4 and 6 to expel the materials therefrom, the use of nitrogen is preferred. A conventional high pressure regulating valve 10 is conveniently used to distribute nitrogen gas among the tanks 4 and 6 as well as to the mixing chamber 36.

The nitrogen gas pressure imposed upon the reactants in the reactant storage tanks 4 and 6 forces the interreacting material through outlets 44 and 48 into lines 50 and 54 for delivery to the mixing chamber 36. Entry of these materials into the mixing chamber 36 is effected by opening the mixing chamber inlet valves 48 and 58.

The mixing chamber 36, inlets 46 and 56, inlet valves 48 and 58, and check valve 38 may be incorporated into an assembly commonly referred to as a foam gun head 82. The manually actuated valve 42 may be incorporated into the body of the foam gun head or attached to the body. However, it may be considered a part of the foam gun head 82. Likewise, the distributor block 32 may be incorporated into the body of the foam gun head 82 or be attached as shown. In either case it may be considered a part of the foam gun head 82. The mixing chamber 36 preferably includes a static mixer 86 to effect proper mixing of the reactant materials.

Figure 2:
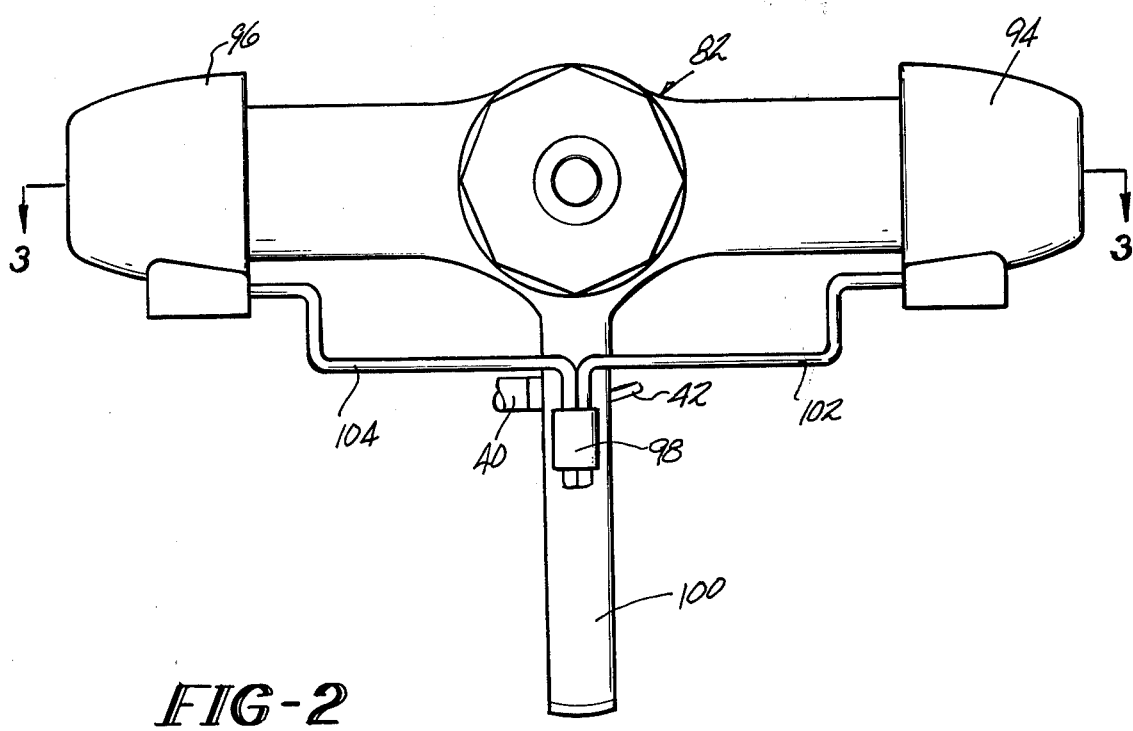
FIG. 2 is a front elevational view of a foam gun head adapted for use with the apparatus shown in FIG. 1.
Figure 3:
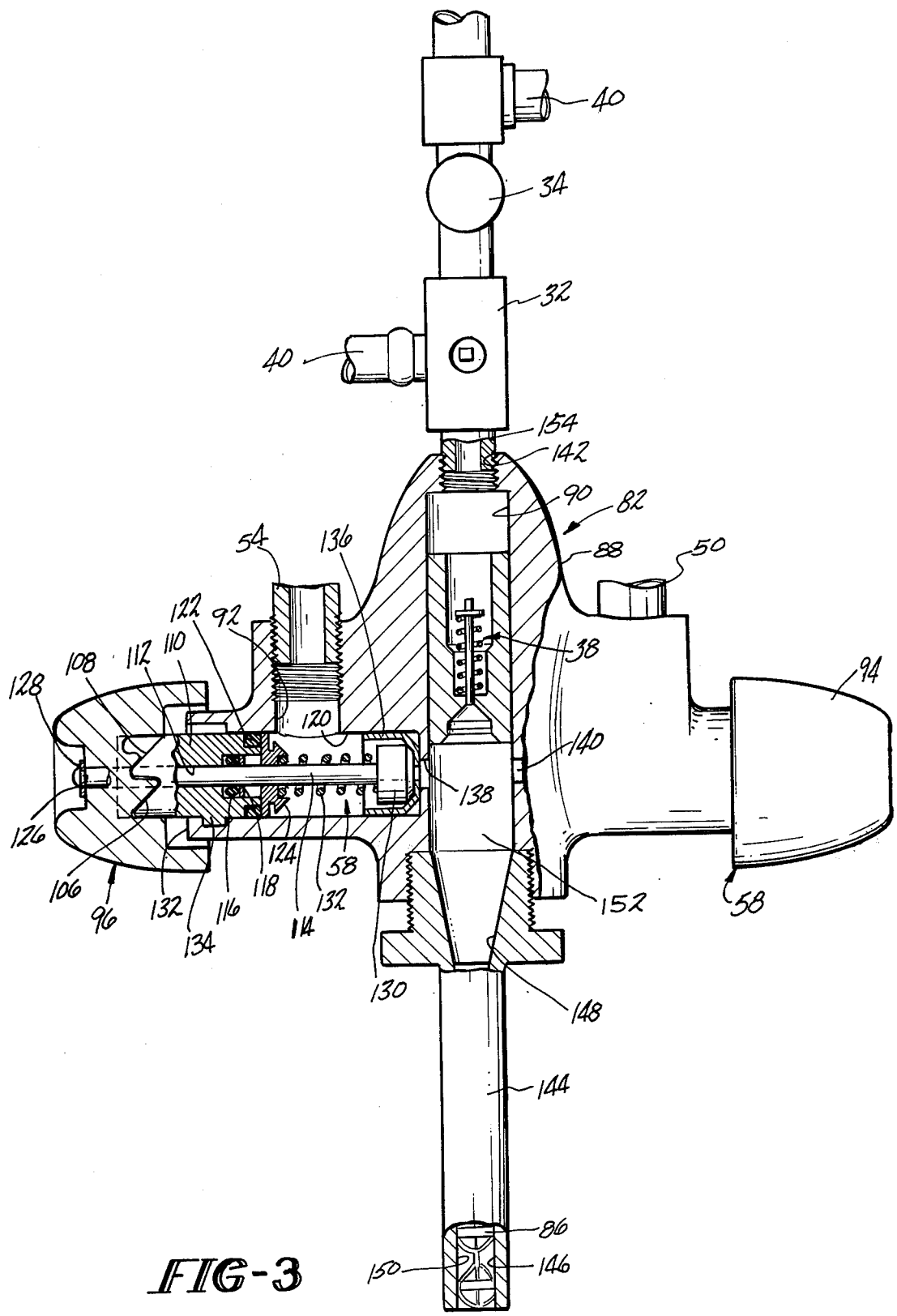
FIG. 3 is a horizontal sectional view taken along the lines 3—3 of FIG. 1.
Figure 4:
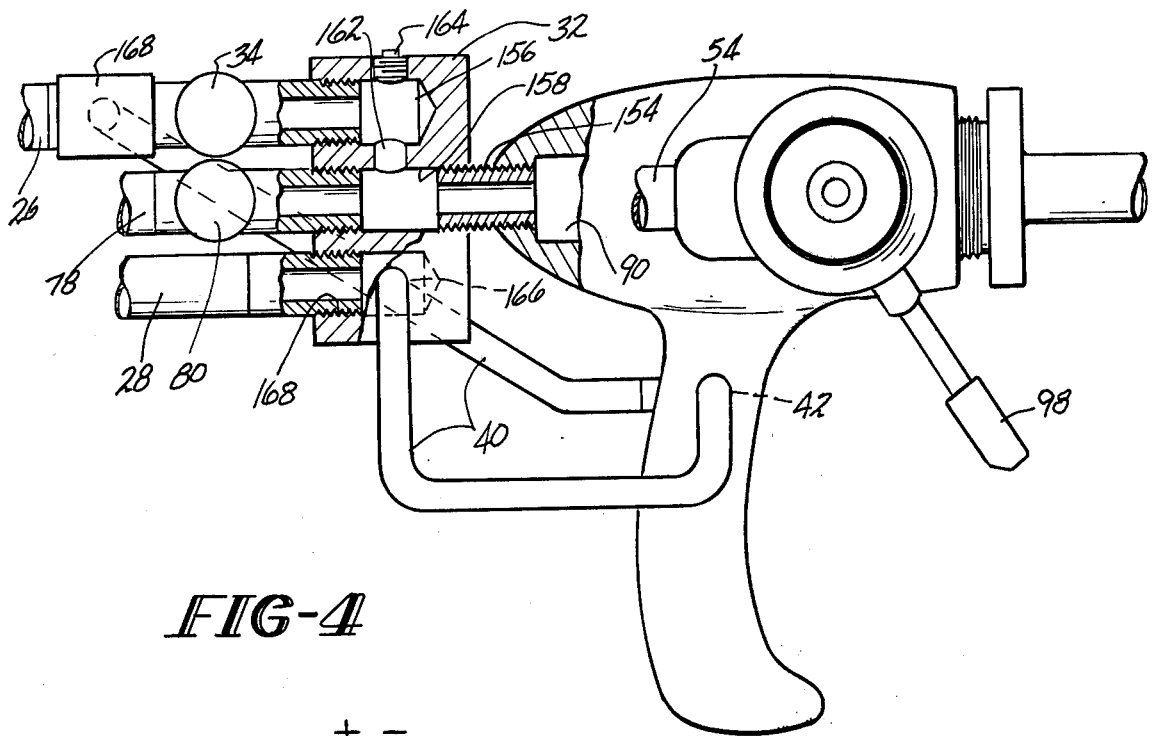
FIG. 4 is a side elevational view, partially in section, of the foam gun head of FIG. 2.

A preferred form of a foam gun head 82 capable for use in connection with the apparatus shown in FIG. 1 is shown in FIGS. 2-4. The foam gun head 82 shown in these figures is similar to the foam gun head shown in U.S. Pat. No. 3,409,044, which issued to Sobek et al on Nov. 5, 1968, with some modifications made as explained below. Reference should be made to that patent for a more detailed explanation of the common features.

The foam gun head 82 includes a main gun body 88 having with a central passage 90 and first and second inlet passages 92 which have an axis parallel to but offset to either side of the axis of passage 90. As the structure of the foam gun head 82 on the right-hand side of the central passage is the mirror image of that on the left-hand side as viewed in FIG. 3, only the left side is shown in detail. The inlet passages 92 are arranged to be placed in communication with the central passage 90 by the first and second inlet valves 48 and 58. Valve actuators 94 and 96 actuate the valves 48 and 52 and are operated simultaneously by a trigger 98 and associated pistol grip structure 100 through connecting links 102 and 104. The arrangement is such that the gun may be held in one hand and the valve actuators 94 and 96 operated simultaneously by the trigger 100.

Each of the valve actuators 94 and 96 includes a recessed interior portion having a circumferentially disposed cam follower surface portion 106. These cam follower surfaces 106 in turn are arranged to co-operate with cam surfaces 108 formed on one end of a valve body 110. The valve body 110 includes a central bore 117 arranged to receive an elongated valve stem 114. To provide a proper sealing relationship between the valve body 110 and valve stem 114, there is provided an inner O-ring 116 and washer 118. An outer seal between the valve body 110 and a portion of a side bore opening 120 in the gun body 82 is in turn affected by an outer O-ring 122 and backing plate 124.

The outer end of each valve stem 114 includes an annular groove 126 adapted to receive a snap ring 128 after the stem 114 has been passed through the central bore 112 in the valve body 110 and the actuators 94 and 96. This snap ring 128 secures the valve stem 114 to the valve actuator 96 for axial movement therewith. The inner end of each valve stem 114 terminates in an enlarged valve head structure including a valve head 130. A valve head biasing spring 132 extends between the backing plate 124 and the head 130 to bias the valve head 130 against the valve seat.

The gun body 74 is provided with the side bore openings 120 on either side of the central passage 90 in which a valve body 110 is mounted. The openings 120 includes an inwardly extending projection 137 which cooperates with a suitable projection 134 on the valve body 110 to form a bayonet connection between the valve body 110 and gun body 82.

Mounted within the side bores 120 is a cup-shaped valve seat-orifice 136. The valve seat-orifice 136 may be press-fitted into its respective bore 120 or otherwise secured thereto. The foam gun body 82 is provided with enlarged openings 138 and 140 downstream of the valve seat-orifices 136.

The rear portion of the gun body 82 may include an inlet 142 in communication with the central passage 90. Positioned in central passage 90 between the inlet 142 and a nozzle 144 is the check valve 38. It is to be noted that the check valve 38 is provided in the central passage 90 at a point slightly to the rear of the openings 138 and 140.

The nozzle member 144 is threadedly attached to the forward end of gun body 82. The nozzle member 144 includes a bore 146 therethrough which is co-axial with and in communication with the central passage 90 in the gun body 82. The bore 146 includes a rearward frustoconical tapering portion 148 and a forward reduced cylindrical portion 150. The rearward tapering portion 149 tapers forwardly and rearwardly from a diameter substantially equal to the diameter of the central passage 90 to a diameter substantially equal to the diameter of the forward reduced portion 150.

A static mixer 86 may be mounted in the reduced portion 150 of the bore 146 of the nozzle member 144. The static mixer aids in effecting the mixing of the materials without any moving parts. Any suitable static mixer may be used, for example, as shown in U.S. Pat. No. 3,286,922, issued Nov. 22, 1966, to Armeniades et al and U.S. Pat. No. 3,361,412, issued Jan. 2, 1968, to Cole. A preferred form of the static mixer is known as a Komax mixer and is manufactured by Komax System, Inc. of Carson, California.

Operation of the valves of the foam gun head 82 is effected by movement of the trigger member 98. Movement of the trigger member 98 causes limited simultaneous rotation of the valve actuators 94 and 96 about their axis. In so doing, the inter-action of cam surfaces 106 and 108 causes each of the valve actuators 94 and 96 and their associated valve stems 114 to move outwardly away from the central passage 90, causing unseating of the valve head 130 and opening of the inlets 138 and 140.

For the purpose of the description of this invention, the forward portion 152 of the central passageway 90, upstream of check valve 38, along with the bore 146 of the nozzle member 144, including the portion containing the static mixer 86, may be considered the mixing chamber 36. Most of the mixing will be effected in the bore of the nozzle 144 as the reactants pass through the static mixer 86.

As shown in FIGS. 3 and 4, the distributor block 32 is connected to the inlet 142 in the gun body 82 by a suitable tubular connection 154. As shown, the distributor block 32 is positioned immediately to the rear of the gun body 88.

The distributor block 32 includes three vertically aligned bores 156, 158 and 160, each having an axis parallel to the axis of the central passage 70 of the gun body 88. The middle bore 158 is a through bore and is connected at its forward end to connection 154. Bores 154 and 156 are interconnected within the distributor block 32 by a bore 162 drilled in from the top of the distributor block. A plug 164 is threaded into the upper end of bore 162 to close the bores 154, 158 and 162 to the outside.

As may be seen in FIG. 3, line 26 coming from the purge gas source and in which purge gas valve 30 is located is attached to bore 156 along with check valve 34. Line 78 coming from one outlet of solvent valve 70 is attached, along with check valve 80, to bore 158.

Line 28, coming from the purge gas source is connected directly to bore 166. Another bore 166 in the side of the distributor block 32 communicates with bore 160. Line 40 is connected to bore 166 and runs to the manually actuated valve 42 which is mounted in the pistol grip 100 of the gun body 88. The valve 42 may be a toggle actuated, normally closed, spring based spool valve. Line 40 continues from the outlet of the valve 42 to a T-shaped connection 168 in the line 26 immediately to the downstream side of check valve 34.

Referring to FIG. 1, the solvent storage tank 60 is preferably in the form of a console having an enclosed chamber 170 for holding a suitable solvent and a lower portion 172 for housing the pump 67 and also valves 30 and 70 if desired. The top of the storage tank 60 may constitute a lid member 174 capable of being removed to facilitate the filling of the solvent chamber 170. The lid 174 is provided with an opening forming the inlet 62 to receive a portion of the foam gun head 82 for return of solvent to the chamber 170. The bottom of chamber 170 is provided with an opening forming the outlet 64 through which the solvent outlet pipe 66 extends. A second opening in the bottom forms the return inlet 76 through which the return piping 72 extends. The return piping 72 extends a portion of the way into the chamber 170 and terminates in a U-bend 176 so that the discharge therefrom is in a downward direction.

The solvent valve 70 is a three port valve having an electrical actuator 178. Preferably valve 70 is a solenoid actuated valve and is so positioned that when the solenoid is de-energized, the valve is in position to connect the pump outlet 68 with line 78 to recycle solvent through the mixing chamber 36. When the solenoid is energized, the valve is positioned to close the outlet to line 78 and open the outlet to the return pipe 72.

The purge gas valve 30 is a two port valve having an inlet and an outlet and an electrical actuator 180. The valve is preferably a solenoid actuated valve and so positioned that when the solenoid is de-energized, the valve is closed and when the solenoid is energized, the valve opens to permit purge gas to flow through line 26 through the distributor block 32 and mixing chamber 36.

The sensing switch 84 is preferably of the type called a "proximity switch," meaning a switch which can sense the presence and absence of metal in close proximity and open or close an electrical contact in response to said sensation. For the purpose of this invention, the proximity switch 84 may be positioned on the inside of the lid 174 of the compartment 170 adjacent the inlet 62. At least the nozzle member 144 of the foam gun head 82 which protrudes through the inlet 62 should be constructed of metal and preferably a ferrous metal. The proximity switch may be of the type which when it senses metal, opens a circuit and when the metal is removed, closes a circuit.

Figure 5:
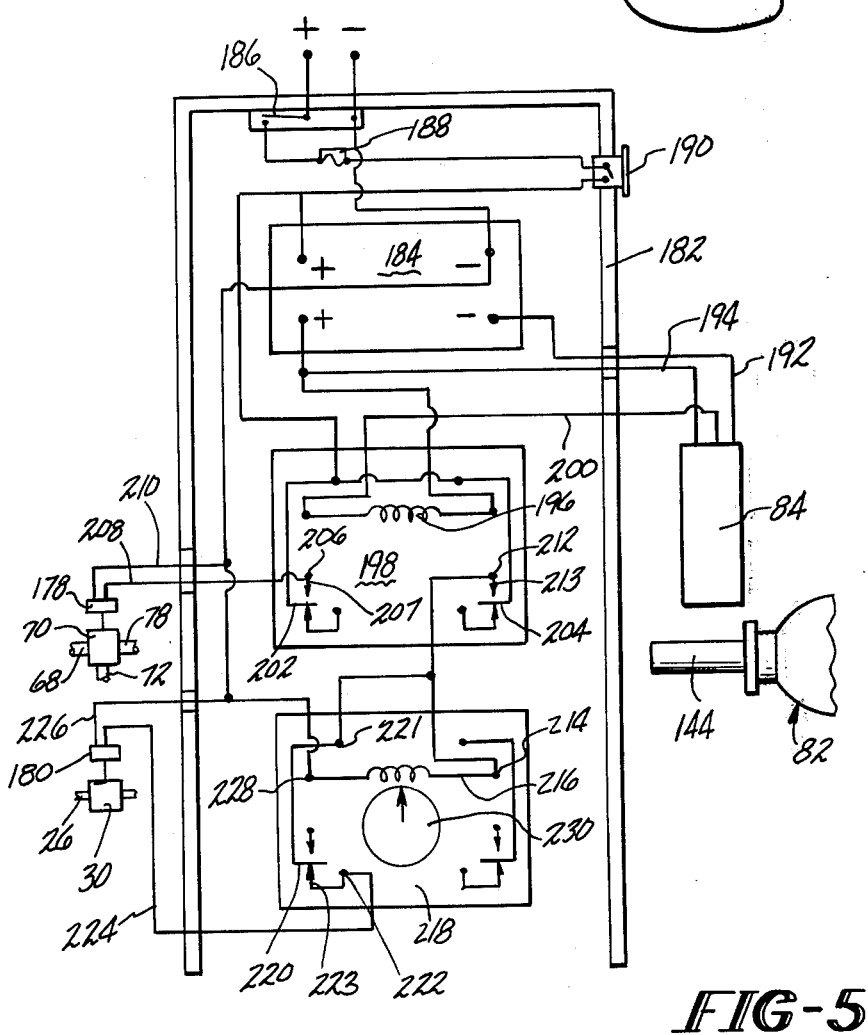
FIG. 5 is a schematic diagram of an electrical circuit which may be used in practicing the present invention.

FIG. 5 shows a schematic diagram of the electrical circuitry which may be used with the present invention. The electrical circuitry may conveniently be mounted in a cabinet 182. The cabinet may be mounted on the back of the solvent storage tank 60 for convenience so that the electrical circuitry is in close proximity to the valves 30 and 70.

A 120 volt alternating current (A-C) power source has its positive side connected to the positive side of power-pack 184 through a normally open spring biased cabinet switch 186, a suitable fuse 188, and a push-pull switch 190 which may also include a light to indicate when switch 190 is closed. The negative side of the A-C power source is connected to the negative terminal of the power pack. The cabinet switch 186 opens the circuit when the door (not shown) of the cabinet is open so that the electrical circuit in the cabinet is de-energized. When the cabinet door is closed, the circuit to the power pack 184 is closed. The push-pull switch 190 is used to open and close the electrical circuitry within the cabinet 182 during the time the electrical circuitry is connected to the main A-C power source.

The power pack 184 serves to rectify A-C current and step down the voltage to a low voltage direct current (D-C). For example, the output of the power-pack may be between 8.5 and 20 volts D-C and preferably about 12 volts D-C.

The proximity switch 84 has its negative lead 192 connected to the negative terminal of the power-pack 184. The positive lead 194 is connected to the positive side of the power-pack 184 and to one terminal of the coil 196 of a relay 198. The third lead 200 of the proximity switch 84 is connected to the other terminal of the coil 196 of the relay 198.

The relay 198 is of the type having two movable contacts 202 and 204, the terminals of which are both connected to the positive side of the A-C power source at a point after the push-pull switch 190. The terminal 206 of the normally open stationary contact 207 associated with the movable contact 202 is connected to the valve actuator 178 of the solvent valve 70 by electrical connector 208 with the other lead 210 of the actuator 178 connected to the negative side of the A-C power source.

The terminal 212 of the normally open stationary contact 213 associated with the movable contact 204 of relay 198 is electrically connected to one terminal 214 of the coil portion 216 of a time delay relay 218. The time delay relay includes at least one movable contact 220, the terminal 221 of which is connected to the normally open terminal 212 of relay 198. The terminal 222 of the normally closed stationary contact 223 associated with the movable contact 220 of the time delay relay 218 is connected to the valve actuator 180 of the gas purge valve 30 by electrical connector 224 with the other electrical connector 226 from the actuator 180 connected to the negative side of the A-C power source. The other terminal 228 of the coil portion 216 of the time delay relay 218 is also connected to the negative side of the A-C power source. The time delay relay 218 includes an adjusting knob 230 which permits adjustment of the time delay upon energization of the coil portion 216 before the movable contact 220 moves to break contact with the normally closed stationary contact 223. The time delay may vary between about 0.2 second to about one second. Preferably, the time delay is 0.2 or 0.3 seconds.

The operation of the electrical circuitry is such that when the proximity switch 84 senses the metallic nozzle member 144 of the foam gun head 82, the circuit between leads 194 and 200 is open so that coil 196 of relay 198 is not energized. Since movable contact 202 does not complete the circuit switch terminal 206 of relay 198 the circuit to the valve actuator 178 of the solvent valve 70 is open, the valve actuator 178 is de-energized, and the valve 70 remains in its normal position wherein the outlet 68 from pump 67 is connected to line 78 which supplies solvent to and through the mixing chamber 36.

When the coil 196 of relay 198 is not energized, stationary contact 213 is not electrically connected to the movable contact 204 of relay 198. Then, the electrical circuit to the coil portion 216 of time delay relay 216 is open and the coil portion 216 is not energized. Also terminal 221 of movable contact 222 is not connected to the positive side of the A-C power source due to contact 213 being open. Thus, the circuit to the valve actuator 180 of the gas purge valve 30 is open, the valve actuator 180 is not energized, and the valve 30 remains in its normal closed position.

When the foam gun head 82 is removed from the solvent tank 60, and is out of range of the proximity switch 84, the circuit between leads 194 and 196 of the switch is closed and the coil 196 of relay 198 is energized. Energization of the coil 198 causes the movable contacts 202 and 204 to move and make contact with the stationary contacts 209 and 213 respectively. The closing of the circuit between contact 202 and terminal 206 complete the circuit to the actuator 178 of solvent valve 70, thereby energizing the actuator 178 which moves the valve so that the outlet 68 from pump 67 is in communication with return piping 72 to the solvent tank 60 and the supply of solvent to the mixing chamber 36 is cut off. Thus, solvent is continuously circulated by pump 67 during the period of time pump 67 is running, the solvent passing either through line 78 or pipe 72 responsive to the presence or absence of metal, respectively. Since the reactants from storage tanks 4 and 6 are pressurized by tank 2 independently of pump 67, the solvent is circulated through pipe 76 when head 82 is removed from tank 60 such as when "shooting" foam.

Concurrently with the energization of the valve actuator 178 due to energization of coil 196 of relay 198, the closing of the circuit between movable contact 204 and terminal 212 of relay 198 results in the energization of valve actuator 180 of the gas purge valve 30 since movable contact 220 will continue to remain in electrical connection with the stationary contact 22 until the time delay period is over. The energization of the valve actuator 180 causes the gas purge valve 30 to open. The coil portion 216 of time delay relay 218, which is energized upon the movement of movable contact 204 of relay 198 into electrical engagement with stationary contact 213 will cause the movable contact 220 of the time delay relay to move out of electrical connection with contact 223 after the preset time delay period is over and open the circuit to the valve actuator 180. Upon opening of the circuit to the valve actuator 180, valve 30 will return to its closed position.

The gas purge valve 30 is only opened for a relatively short period of time after the foam gun head 82 is removed from the solvent tank 60. However, the valve actuator 178 of the solvent 70 will remain energized so that the solvent valve 70 will remain in the position to divert the solvent flow back into the solvent storage tank 60 through the return piping 72 as long as the foam gun head is removed from the solvent storage tank 60 and out of proximity of the proximity switch 84.

When the foam gun head is returned to the solvent storage tank 60, the proximity switch 84 senses the presence of the metallic nozzle member 144 and the circuit between leads 194 and 200 opens, de-energizing coil 196 of relay 198. Upon the de-energization of coil 196, movable contact 202 returns to its normal position, breaking the electrical connection with stationary contact 207. This movement opens the electrical circuit to valve actuator 178 of the solvent valve 70 which de-energizes the actuator 178 and permits the valve to return to its normal position wherein pump outlet 68 is connected to line 78 permitting the solvent to flow from the solvent storage tank 60 through the pump 67 and mixing chamber 36 back into the tank 60.

When the proximity switch senses the presence of the metallic nozzle member of the foam gun head 82 upon return of the foam gun head 82 to the solvent storage tank 60, there will be no effect upon the valve actuator of the gas purge valve 30. This is due to the fact that when the coil 196 of relay 198 is de-energized, movable contact 204 returns to its normal position breaking the electrical circuit with stationary contact 213. Thus, although the coil portion 216 of the time delay relay 218 is de-energized and movable contact 220 returns to its normal position in electrical contact with the stationary contact 223, the electrical circuit to valve actuator 180 of the gas purge valve 30 is not open because of the break between movable contact 204 and the normally open stationary contact 213 of relay 198.

Generally, polyurethane foam is produced, using the one-shot or the pre-polymer technique, by the reaction of a polyol with an organic polyisocyanate in the presence of a reaction catalyst and a foaming agent. Any known foam-forming formulation may be generated by, and dispersed from the apparatus of the present invention. The polyol reactant may be any such material having at least 2 active hydrogens as determined by the Zerewitinoff method, such as described, for example, in U.S. Pat. No. 3,167,528, issued Jan. 26, 1965, to Kaiser et al. Similarly, any organic isocyanate containing at least two NCO groups may be utilized in preparing the foam. Illustrative polyisocyanates include toluene diisocyanates and polymeric isocyanates such as disclosed in U.S. Pat. No. 2,683,730, issued July 13, 1954, to Seeger et al. The foaming agent may be any one of those known in the art to be useful for such purpose such as water, an organic foaming agent, or a mixture of at least two foaming agents. Illustrative organic foaming agents are disclosed in U.S. Pat. No. 3,072,582, which issued Jan. 8, 1963, to Frost. Any catalyst or mixture of catalysts known to be useful in making polyurethane foam may be employed such as disclosed, for example, in U.S. Pat. No. 3,397,158, issued to Britain et al, on Aug. 13, 1968.

In utilizing the apparatus of the present invention, a first reactant material comprising a polyol is placed in one of the reactant storage tanks, for example, the first reactant storage tank 4. Conveniently, a reaction catalyst may also be included in this tank. In another reactant storage tank, the reactant storage tank 6, an organic polyisocyanate or a polyisocyanate polyol prepolymer is placed. The foaming agent may be supplied from a third storage tank or, as is preferred, the foaming agent may be included in at least one and preferably both of reactant storage tanks 4 and 6.

A suitable solvent for the reactant materials is placed in the chamber 170 of the solvent storage tank 60. Such solvent may be methylene chloride, 1,1,1-trichlorethane, or any other solvent suitable for the purpose.

When the shut-off valve 12 of the nitrogen tank 2 is opened, nitrogen will flow through the high pressure regulator 10 to first and second reaction storage tanks 4 and 6. The high pressure regulator 10 preferably maintains the pressure in lines 16 and 20 constant at about 250 psig. The low pressure regulator 22 reduces the pressure of the nitrogen coming from the high pressure regulator 10. The pressure in line 24 is preferably maintained at about 80 - 100 psig.

Preferably, the pump 67 for the solvent is kept running during the day's operation. The foam gun head 82 is normally stored between shots on the solvent tank 60 with the nozzle member 144 extending into the inlet 62. With the electrical circuitry described above in operation, valve 70 will be positioned to permit solvent to flow from the tank 60, through the mixing chamber 36 and back into the tank 60.

When it is desired to generate foam, the operator may remove the foam gun head from the inlet 62 of the solvent storage tank 60. In so doing, the electrical circuitry described above, automatically switches the solvent valve 70 so that the solvent from the pump outlet is diverted into the return piping 72 to flow back into the storage tank 60. Also, upon removal of the foam gun head 82 from the tank 60, the electrical circuitry causes the gas purge valve 30 to open for a short period of time to provide a blast of purging gas to and through the mixing chamber 36 to rid the chamber 36 of as much residual solvent as possible.

The operator may carry the foam to the location where the foam is desired. Upon actuation of the trigger member 98, which simultaneously opens valves 48 and 58, the reactants will flow into the forward portion of the central passage 90 in the foam gun head 82 and into the bore 146 in the nozzle 144 which may be provided with the static mixer 86. As the reactants travel through the mixing chamber, the reactants become fully admixed together and begin to forth, exiting from the end of nozzle 144 as a partially expanded material which continuous to expand outside the chamber of its full free-rise volume. Release of the trigger member 98 closes valves 48 and 58, shutting off the supply of reactant to the mixing chamber.

After each shot, in order to rid the mixing chamber 36 of excess reactant material, it is preferred to actuate manual valve 42 to provide a blast of purging gas to the mixing chamber 36 to expell as much of the remaining reactant material as possible. Though according to the present form of the invention, the gas used for purging, through both values 42 and 70, comes from the nitrogen tank 2 used to pressurize the first and second reactant storage tanks 4 and 6, other suitable gas supplies may be used as the purging gas, such as, for example, compressed air from a readily available source.

When the purging gas for the foam gun head 82 is provided from the nitrogen storage tank 2 used to pressurize the reactant storage tanks 4 and 6, the pressure of the gas flowing to the foam gun head 82 is reduced from the pressure flowing to the storage tanks 4 and 6. In order to provide proper flow to the reactant materials in tanks 4 and 6, a relatively high pressure is needed because of the relatively high viscosity of the materials. By reducing the pressure of the gas flowing to the foam gun, damage to the check valve 38 which might occur if the gas were under relatively high pressure, is minimized.

After receiving the blast of purging gas after a shot, the foam gun head 82 may be returned to the solvent storage tank 60 with the nozzle 144 thereof extending through the inlet 62. The proximity switch 84 senses the return of the foam gun head 82 to the tank 60 and will cause the electrical circuitry to switch the solvent valve back to its normal position so that solvent can flow from the pump outlet 68 to line 78. A continuous stream of solvent will pass through the mixing chamber 36 and into the tank 60 to continuously flush the foam gun head 82 as long as foam gun head 87 is mounted on the tank and the pump is activated.

By virtue of the above described arrangement, the solvent utilized in flushing the mixing chamber of a foam generating apparatus is automatically continuously recycled through the mixing chamber when the foam gun head is at rest. This ensures maximum cleaning of the mixing chamber, preventing undesirable build-up of the reactant material. Upon removal of the foam gun head from its rest position, the solvent is automatically diverted from the foam gun head and the mixing chamber automatically receives a blast of purging gas to remove residual solvent.

What is claimed is:

1. In a foam generating apparatus wherein at least two inter-reactive foam-forming materials are mixed and foam generated therefrom, said apparatus including a foam gun head having a mixing chamber for mixing said materials, and solvent storage means for storing a solvent, the improvement comprising:
    a. means for supplying solvent from said solvent storage means to said mixing chamber through an electrically actuated solvent value when said valve is in a first position and for by-passing said mixing chamber and returning said solvent directly to said solvent storage means when said solvent valve is in a second position,
    b. electrical sensing means for sensing the presence of the foam gun head in a first position wherein said foam gun head is in a position to discharge solvent from said mixing chamber into said solvent storage tank, and
    c. electrical circuit means responsive to the electrical sensing means sensing the presence of said foam gun head in said first position for causing actuation of said solvent valve to move it to its first position and responsive to the electrical sensing means sensing the removal of said foam gun head from said first position to move said solvent valve to its second position.

2. In the foam generating apparatus of claim 1, said solvent valve being a solenoid actuated valve.

3. In the foam generating generating apparatus of claim 1, said electrical sensing means being a proximity switch.

4. In the foam generating apparatus of claim 1, said electrical circuit means including a relay, said electrical sensing means actuating said relay, and said relay causes actuation of said valve.

5. In the foam generating apparatus of claim 1, said means for supply, said solvent being a pump.

6. In the foam generating apparatus of claim 1, the improvement further comprising means for supplying purging gas to said mixing chamber through an electrically actuated purging gas valve, said purging gas valve being normally closed, and second electrical circuit means responsive to the electrical sensing sensing the removal of said foam gun head from its first positions for causing the activation of said purging gas valve to open said purging gas valve for a predetermined time period to provide a blast of purging gas to said mixing chamber.

7. In the foam generating apparatus of claim 6, said purging gas valve being a solenoid actuated valve.

8. In the apparatus of claim 6, said electrical sensing means being a proximity switch, said electrical circuit means for causing activation of said solvent valve including a relay, said electrical sensing means actuating said first relay and said first relay causing actuation of said solvent valve, said electrical circuit means for causing the activation of said purging gas valve including a time delay relay.

9. A foam generating apparatus wherein at least two inter-reactive foam-forming materials are mixed and foam generated therefrom, said apparatus comprising:
    a. a foam gun head including a mixing chamber for mixing said materials;
    b. means for supplying said materials to said mixing chamber through first and second mixing chamber inlet valves;
    means for opening and closing said first and second mixing chamber inlet valves;
    d. a solvent storage tank;
    e. means for supplying solvent from said tank to the mixing chamber through an electrically actuated solvent valve when said valve is in a first position and for by-passing said mixing chamber and returning said solvent directly to said tank when said solvent valve is in a second position;
    f. electrical sensing means for sensing the presence of the foam gun head in a first position wherein said foam gun head is in a position to discharge solvent from the mixing chamber into the tank; and
    g. electrical circuit means responsive to the electrical sensing means sensing the presence of said foam gun head in said first position for causing actuation of said solvent valve to move it to its first position and responsive to the electrical sensing means sensing the removal of said foam gun head from its first position to move said solvent valve to its second position.

10. The foam generating apparatus of claim 9 further including means for supplying purging gas to said mixing chamber through an electrically actuated purging gas valve being normally closed, and second electrical circuit means responsive to the electrical sensing means sensing the removal of said foam gun head from its first position for causing the activation of said purging gas valve to open said purging gas valve for a predetermined period of time to provide a blast of purging gas to said mixing chamber.

11. The foam generating apparatus of claim 10 wherein said tank includes a solvent storage compartment having a cover thereon, said cover having an opening therein, said foam gun head includes an elongated nozzle, said nozzle extending through said opening into the compartment when said foam gun head is in its first position, said electrical sensing means being mounted on the inside of said lower adjacent said opening.

12. A method of automatically cleaning the mixing chamber of a foam generating apparatus, said apparatus being of the type wherein at least two inter-reactive materials are mixed and foam generated and including a foam gun head having a mixing chamber, solvent storage means for storing a solvent, and means for supplying solvent to the mixing chamber when an electrically actuated solvent valve is in a first position and for by-passing said mixing chamber and returning said solvent to said storage means when said valve is in a second position said method comprising:
    a. electrically sensing the presence of the foam gun head when the foam gun head is in a first position to discharge solvent from the mixing chamber into the solvent storage means, b. electrically actuating said solvent valve to move said valve to its first position in response to the sensing of the foam gun head in said first position, and c. electrically actuating said solvent valve to move said valve to the second position in response to the electrical sensing of the removal of said foam gun head from its first position.

13. The method of claim 12 further comprising:

d. electrically actuating said solvent valve to return to its first position in response to repeated sensing of the foam gun head in said first position.

14. The method of claim 12 wherein the apparatus further includes means for supply purging gas to the mixing chamber through an electrically actuated purging gas valve which is normally closed, said method further including electrically actuating said purging gas valve in response to the electrical sensing of the removal of the foam gun head from its first position to open said purging gas valve for a predetermined period of time to provide a blast of purging gas to said mixing chamber.

15. The method of claim 14 wherein the foam gun head is sensed by a proximity switch.

16. The method of claim 14 wherein a time delay relay is used in opening the purging gas valve for the predetermined period of time.

17. The method of claim 14 wherein the solvent valve and purging gas valves are solenoid actuated valves.

18. The method of claim 14 wherein said actuation of said solvent valve to move to said second position and said actuation of said purging gas valve are sequential.

19. Apparatus for automatically cleansing the mixing chamber of a foam generating device wherein at least two inter-reactive foam-forming materials are mixed and foam generated therefrom, said foam generating device including a foam gun head having a mixing chamber for mixing said materials, and solvent storage means for storing a solvent, comprising:

a. means for supplying solvent from said solvent storage means to said mixing chamber through an electrically actuated solvent valve when said valve is in a first position and for by-passing said mixing chamber and returning said solvent directly to said solvent storage means when said solvent valve is in a second position, b. electrical sensing means for sensing the presence of the foam gun head in a first position wherein said foam gun head is in a position to discharge solvent from said mixing chamber into said solvent storage tank, and c. electrical circuit means responsive to the electrical sensing means sensing means sensing the presence of said foam gun head in said first position for causing actuation of said solvent valve to move it to its first position and responsive to the electrical sensing means sensing the removal of said foam gun head from said first position to move said solvent valve to its second position.

20. In the cleansing apparatus of claim 19, said solvent valve being a solenoid actuated valve.

21. In the cleansing apparatus of claim 19, said electrical sensing means being a proximity switch.

22. In the cleansing apparatus of claim 19, said electrical circuit means including a relay, said electrical sensing means actuating said relay, and said relay causes actuation of said valve.

23. In the cleansing apparatus of claim 19, said means for supply, said solvent being a pump.

24. In the cleansing apparatus of claim 19, the improvement further comprising means for supplying purging gas to said mixing chamber through an electrically actuated purging gas valve, said purging gas valve being normally closed, and second electrical circuit means responsive to the electrical sensing means sensing the removal of said foam gun head from its first positions for causing the activation of said purging gas valve to open said purging gas valve for a predetermined time period to provide a blast of purging gas to said mixing chamber.

25. In the cleansing apparatus of claim 24, said purging gas valve being a solenoid actuated valve.

26. In the apparatus of claim 24, said electrical sensing means being a proximity switch, said electrical circuit means for causing activation of said solvent valve including a relay, said electrical sensing means actuating said first relay and said first relay causing actuation of said solvent valve, said electrical circuit means for causing the activation of said purging gas valve including a time delay relay.

27. A foam generating apparatus wherein at least two inter-reactive foam-forming materials are mixed and foam generated therefrom, said apparatus comprising:

a. a foam gun head including a mixing chamber for mixing said materials;

b. means for supplying said materials to said mixing chamber through first and second mixing chamber inlet valves;

c. means for opening and closing said first and second mixing chamber inlet valves;

d. a cleansing solvent storage tank;

e. means for supplying cleansing solvent from said tank to the mixing chamber through an electrically actuated solvent valve when said valve is in a first position and for bypassing said mixing chamber and returning said solvent directly to said tank when said solvent valve is in a second position;

f. electrical sensing means for sensing the presence of the foam gun head in a first position wherein said foam gun head is in a position to discharge said solvent from the mixing chamber into the tank; and g. electrical circuit means responsive to the electrical sensing means sensing the presence of said foam gun head in said first position for causing actuation of said solvent valve to move it to its first position and responsive to the electrical sensing means sensing the removal of said foam gun head from its first position to move said solvent valve to its second position.

28. The foam generating apparatus of claim 27 further including means for supplying purging gas to said mixing chamber through an electrically actuated purging gas valve being normally closed, and second electrical circuit means responsive to the electrical sensing means sensing the removal of said foam gun head from its first position for causing the activation of said purging gas valve to open said purging gas valve for a predetermined period of time to provide a blast of purging gas to said mixing chamber.

29. The foam generating apparatus of claim 28 wherein said tank includes a solvent storage compartment having a cover thereon, said cover having an opening therein, said foam gun head includes an elongated nozzle, said nozzle extending through said opening into the compartment when said foam gun head is in its first position, said electrical sensing means being mounted on the inside of said lower adjacent said opening.

* * * * *